US010652388B2

(12) United States Patent
Sena, Jr.

(10) Patent No.: US 10,652,388 B2
(45) Date of Patent: May 12, 2020

(54) COMMUNICATION SYSTEMS AND METHODS FOR CAUSING DISPLAY OF VISUAL CONTENT ON A SCREEN ASSOCIATED WITH A CALLING DEVICE

(71) Applicant: Neustar, Inc., Sterling, VA (US)

(72) Inventor: Guido Jonjie S. Sena, Jr., Sterling, VA (US)

(73) Assignee: Neustar, Inc., Sterling, VA (US)

( * ) Notice: Subject to any disclaimer, the term of this patent is extended or adjusted under 35 U.S.C. 154(b) by 0 days.

(21) Appl. No.: 15/791,169

(22) Filed: Oct. 23, 2017

(65) Prior Publication Data

US 2019/0124199 A1 Apr. 25, 2019

(51) Int. Cl.
*H04M 3/30* (2006.01)
*H04M 3/42* (2006.01)

(52) U.S. Cl.
CPC ..... *H04M 3/42093* (2013.01); *H04M 3/4211* (2013.01); *H04M 2201/38* (2013.01)

(58) Field of Classification Search
CPC . H04M 3/30; H04M 3/42017; H04M 3/42093
See application file for complete search history.

(56) References Cited

U.S. PATENT DOCUMENTS

| | | | | |
|---|---|---|---|---|
| 8,068,593 | B2 * | 11/2011 | Batni et al. | H04M 3/30 370/352 |
| 2006/0147010 | A1 * | 7/2006 | Batni | H04M 3/30 379/202.01 |
| 2007/0127642 | A1 * | 6/2007 | Bae | H04L 29/06027 379/88.13 |
| 2007/0211872 | A1 * | 9/2007 | Cai | H04M 3/42093 379/142.01 |
| 2010/0318614 | A1 | 12/2010 | Sager et al. | |
| 2014/0106720 | A1 * | 4/2014 | Mairs | H04M 3/42102 455/415 |
| 2014/0295802 | A1 | 10/2014 | Rybak et al. | |
| 2014/0335822 | A1 | 11/2014 | Jian | |
| 2017/0339273 | A1 | 6/2017 | White et al. | |

\* cited by examiner

*Primary Examiner* — Myron Wyche
(74) *Attorney, Agent, or Firm* — Sterne, Kessler, Goldstein & Fox P.L.L.C.

(57) ABSTRACT

Computer systems and methods for displaying on a device associated with a calling party visual content customized by a called party are disclosed. In one implementation, a device associated with a calling party includes one or more processors may be configured to obtain a request to establish a communication session with a device associated with a called party. The one or more processors may be further configured to, in response to obtaining the request to establish the communication session, attempt to initiate the communication session and transmit an identifier associated with the called party to a server and obtain display data from the server. The display data may be generated based on configuration data associated with the called party. The one or more processors may be further configured to cause display of visual content generated based on the display data.

18 Claims, 7 Drawing Sheets

COMMUNICATION SYSTEMS AND METHODS FOR CAUSING DISPLAY OF VISUAL CONTENT ON A SCREEN ASSOCIATED WITH A CALLING DEVICE

TECHNICAL FIELD

The present disclosure relates to communications systems and methods for causing display of visual content on a screen associated with a calling device, the visual content being generated based on configuration data provided by a called party. In particular, the present disclosure relates to communications systems and methods for causing display of visual content on a screen associated with a calling device after the calling device attempts to initiate a communication session with a called device, the visual content being generated based on configuration data provided by a called party.

BACKGROUND

Caller ID is a telephone service that displays information derived from the calling party's phone number on the called party's phone at the start of the call. The derived information often includes the name of the individual or business that owns the phone number. In some situations, other information may be displayed, such as the phone number and the location (e.g., City and State) associated with the phone number.

Historically, the information shown on the called party's phone may be truncated to fifteen characters because of display limitations associated with older phones. The advent of smartphones with larger displays, however, allows for longer names, as well as other media such as photos.

SUMMARY

In one embodiment, a device associated with a calling party includes one or more processors that may be configured to obtain a request to establish a communication session with a device associated with a called party. The one or more processors may be further configured to, in response to obtaining the request to establish the communication session, attempt to initiate the communication session and transmit an identifier associated with the called party to a server and obtain display data from the server. The display data may be generated based on configuration data associated with the called party. The configuration data may be defined upfront, or modified via manual or programmatic means, to change on an as-needed basis. The one or more processors may be further configured to cause display of visual content generated based on the display data.

In another embodiment, a method for displaying on a device associated with a calling party visual content customized by a called party may include obtaining a request to establish a communication session with a device associated with a called party and, in response to obtaining the request to establish the communication session, attempting to initiate the communication session. The method may further include, in response to obtaining the request to establish the communication session, transmitting an identifier associated with the called party to a server and obtain display data from the server. The display data may be generated based on configuration data associated with the called party. The method may further include causing display of visual content generated based on the display data.

In yet another embodiment, a non-transitory computer-readable storage medium stores instructions that when executed by a computer may cause the computer to perform a method for displaying on a device associated with a calling party visual content customized by a called party. The method may include obtaining a request to establish a communication session with a device associated with a called party and, in response to obtaining the request to establish the communication session, attempting to initiate the communication session. The method may further include, in response to obtaining the request to establish the communication session, transmitting an identifier associated with the called party to a server and obtain display data from the server. The display data may be generated based on configuration data associated with the called party. The method may be further include causing display of visual content generated based on the display data.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

Overview

Aspects of the disclosure pertain to communications systems and methods for causing display of visual content on a screen associated a calling device, the visual content being generated based on configuration data provided by a called party. In particular, the present disclosure relates to communications systems and methods for causing display of visual content on a screen associated a calling device after the calling device attempts to initiate a communication session with a called device, the visual content being generated based on configuration data provided by a called party.

In one example, the visual content may be displayed on a cellular phone of a calling party placing a call to a land-line phone of an organization. In this example, the visual content displayed on the cellular phone may be generated based on configuration data provided by the called organization or a person representing the organization. The visual content may include, for example, the organization's logo, product advertisements, and/or links to the organization's website. The visual content may further include, for example, information associated with the calling party that is accessible to the organization, such as the calling party's customer number, their loyalty status (e.g., platinum), and a summary of the calling party's last call to the organization. Accordingly, the visual content shown on the calling device may be personalized in a manner defined by the called party.

Examples of an Operating Environment

Figure 1:
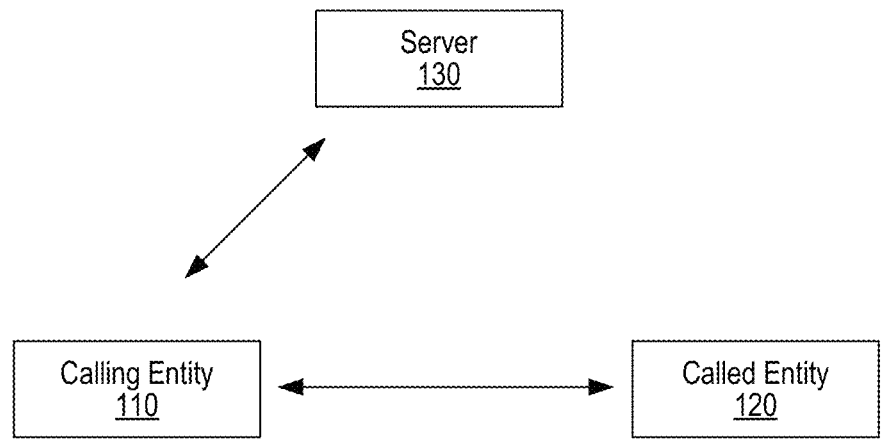
FIG. 1 illustrates an example of a communication system in accordance with the disclosed embodiments.

FIG. 1 illustrates an example of a communication system 100 in which concepts consistent with the principles of the invention may be implemented. As shown in FIG. 1, system 100 shows a device associated with a calling party (i.e., calling entity 110), a device associated with a called party (i.e., called entity 120), and a server 130.

In system 100, calling entity 110 may be any entity that has a capability to attempt initiating a communication session with called entity 120 and a capability to participate in the established communication session with called entity 120. In some embodiments, calling entity 110 may be a portable communications device. For example, calling entity 110 may be a cellular phone, a tablet, a laptop, or a smart watch. In some embodiments, calling entity 110 may be a communication server or system. For example, calling entity 110 may be a customer support system that may place a call to one or more customers. In some embodiments, calling entity 110 may be an internet-of-things (IoT) device or a home appliance. For example, calling entity 110 may be a home phone or a home-assistance program integrated with a home appliance. In some embodiments, calling entity 110 may include a plurality of entities. For example, calling entity 110 may include a phone and a computer connected to the phone.

Moreover, calling entity 110 may be associated with at least one party (i.e., calling party). In some embodiments, calling entity 110 may be owned, operated, maintained, accessible, and/or authorized to use by one or more calling parties. For example, an owner of calling entity 110, who may or may not be a user of calling entity 110, may be a calling party associated with calling entity 110. In some embodiments, calling entity 110 may be associated with a plurality of parties. For example, calling entity 110 may be a public telephone or a public kiosk. In this example, calling parties may include, for example, various users, an owner, and an operator of the public telephone or kiosk.

Similarly, called entity 120 may be any entity that has a capability to participate in a communication session established with calling entity 110. In some embodiments, called entity 120 may be a portable communications device. For example called entity 120 may be a cellular phone, a tablet, a laptop, or a smart watch. In some embodiments, called entity 120 may be a communication server or system. For example, called entity 120 may be an automated call-answering system and/or a customer support system that may forward the received calls to available customer service representatives. In some embodiments, called entity 120 may be an internet-of-things (IoT) device or a home appliance. For example, called entity 120 may be a home phone or a home-assistance program integrated with a home appliance. In some embodiments, called entity 120 may include a plurality of entities. For example, called entity 120 may include a phone and a PC connected to the phone.

Moreover, called entity 120 may be associated with at least one party (i.e., called party). In some embodiments, called entity 120 may be owned, operated, maintained, accessible, and/or authorized to use by a called party. For example, an owner of called entity 120, who may or may not be a user of called entity 120, may be a called party associated with called entity 120. In some embodiments, called entity 120 may be associated with a plurality of parties. For example, called entity 120 may be a public telephone or a public kiosk. In this example, called parties may include, for example, various users, an owner, and an operator of the public telephone or kiosk.

As used herein, a "party" refers to one or more persons, one or more computers, and/or one or more organizations that are associated with an entity. For example, a calling party may be a person making a phone call while a called party may be a team of customer support representatives receiving the call. In another example, a calling party may be a person representing an organization making a phone call while a called party may be a computer program for answering the call (e.g., AI bot). In yet another example, a calling party may be an organization that owns and operates the communication system (i.e., calling entity 110) that places calls to customer's phones (i.e., called entity 120).

In system 100, calling entity 110 and called entity 120 may be indirectly connected via one or more communications networks. For example, calling entity 110 may be connected to called entity 120 via public-switched telephone network (PSTN), the Internet, and/or one or more private communications networks. Accordingly, in these embodiments, calling entity 110 and/or called entity 120 may include, or have access to, a communication module for communicating via the connected network. For example, calling entity 110 and/or called entity 120 may include, or have access to, a communication module based on one or more of the following network communication technologies: Voice-over IP (VOIP), Ethernet, Wi-Fi, Bluetooth, 3G, 4G, 4GPP/LTE, and 5G. Alternatively, or additionally, calling entity 110 and called entity 120 may be directly connected via one or more communication technologies. For example, calling entity 110 may be directly connected to called entity 120 via Wi-Fi, Ethernet, Bluetooth, and/or near-field communication (NFC).

A communication session may include a voice (e.g., a phone call), video, and/or a text communication session (e.g., SMS, MMS, IM). The communication session between calling entity 110 and called entity 120 may be established over, for example, the PSTN, the Internet, and/or cellular networks. In some embodiments, a communication session may be established using one or more pieces of software on calling entity 110. For example, a communication session may be established using an app (e.g., Whatsapp, Skype, Viber) on a cellular phone.

In embodiments where the communication session includes a voice communication session, calling entity 110 and/or called entity 120 may include, or have access to, a microphone for capturing audio. In embodiments where the communication session includes a video communication session calling entity 110 and/or called entity 120 may include, or have access to, a camera and/or a screen. In embodiments where the communication session includes a text communication session, calling entity 110 and/or called entity 120 may include, or have access to, a keyboard, a speaker (e.g., for reading the received and/or sent text communication), and/or a screen.

In embodiments where calling entity 110 and/or called entity 120 includes, or have access to, a screen, the screen may be capable of displaying visual content, which may include a static visual content (e.g., a photograph) and/or a dynamic visual content (e.g., a video or an animation). In some embodiments, calling entity 110 and/or called entity 120 may further include, or have an access to, an interface for interacting with the displayed visual content. For example, the screen may be a touchscreen and the displayed visual content may respond to the touch (e.g., by changing the displayed visual content based on the location of the touch). In another example, calling entity 110 and/or called entity 120 may include, or have an access to, an input device such as a mouse or a microphone that can be used to interact with the displayed visual content. In some embodiments, the interactive visual content may be used to communicate with called entity 110 and/or another device associated with the called party. For example, the input from the input device may be transmitted to called entity 110 and/or another device associated with the called party.

A communication session may be established after calling entity 110 initiates a communication session. In some embodiments, the communication session may be established after a handshake process. For example, the communication session may be established after a handshake process between calling entity 110 and called entity 120 and/or a handshake process between calling entity 110 and a communication server.

A communication session is considered to have been established when calling entity 110 is able to transmit data to called entity 120 or when called entity 120 is able to transmit data to calling entity 110. Alternatively, a communication session is considered to have been established when calling entity 110 is able to receive data from called entity 120 or when called entity 120 is able to receive data from calling entity 110.

In system 100, server 130 may be any entity capable of providing display data to calling entity 110. The display data may be any data that may be used by calling entity 110 to cause display of visual content. In some embodiments, the display data may be provided to calling entity 110 after calling entity 110 attempts to initiate a communication session with called entity 120. Calling entity 110, after receiving the display data, may cause display of visual content generated based on the display data on a screen associated with calling entity 110.

In some embodiments, the display data may include data representing at least a portion of the visual content. For example, the display data may include data representing a picture. Alternatively, or additionally, the display data may include an instruction for generating at least a portion of the visual content. For example, the display data may include some code based on a markup language (e.g., HTML). In another example, the display data may include some code based on a proprietary language for defining appearances of various objects included in the visual content. In these examples, the code may be used by calling entity 110 to generate and cause display of visual content. In some embodiments, the display data may include a software program or an identifier of the software program on calling entity 110. Upon receiving the software program or the identifier of the software program, calling entity 110 may install and/or execute the software program. The software program may be programmed to generate and cause display of visual content.

Server 130 may include one or more physical and/or virtual servers. Alternatively, or additionally, server 130 may include one or more services implemented on a cloud platform, such as Amazon Web Service, Google Cloud, and Microsoft Azure.

Figure 2:
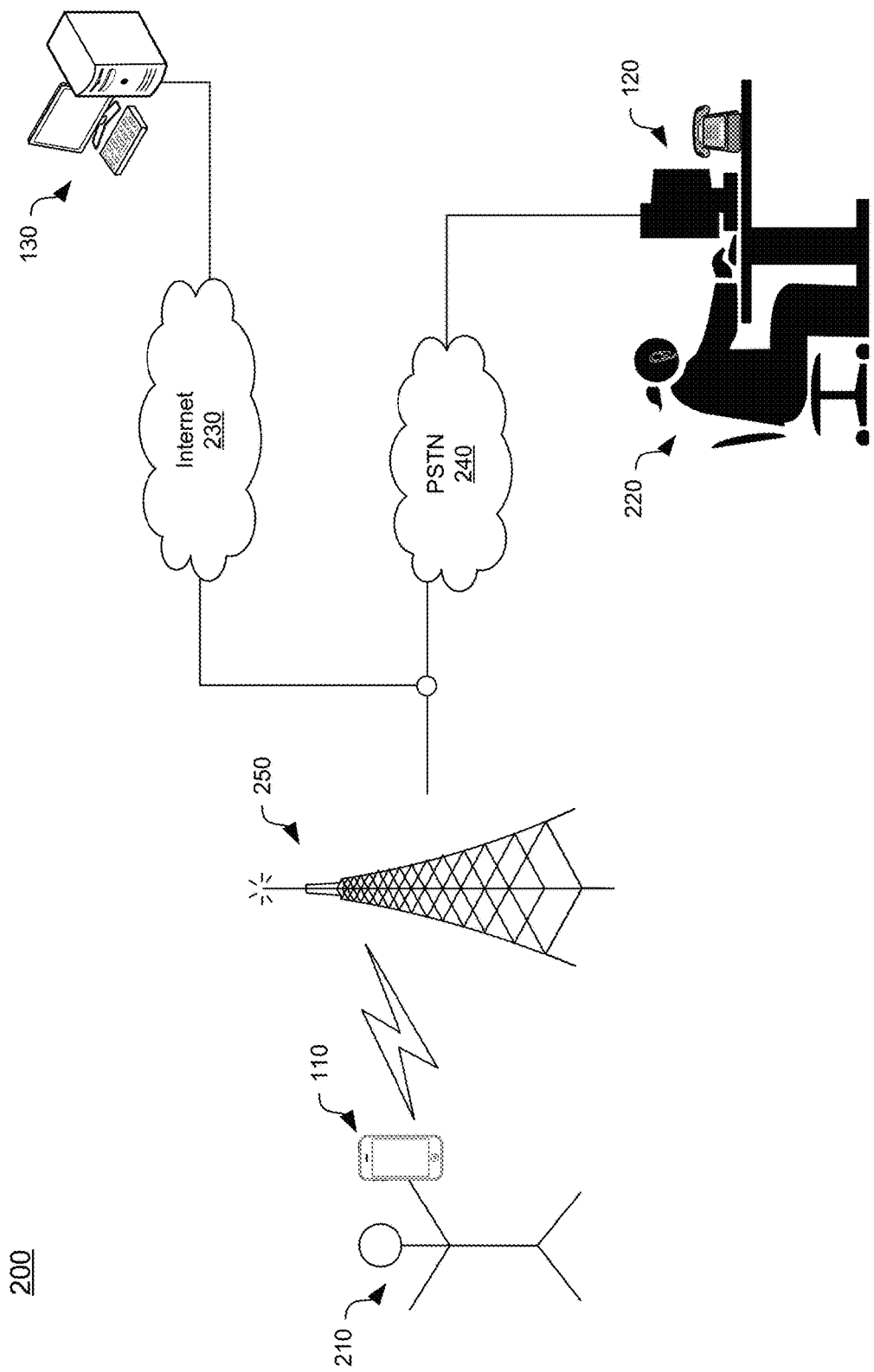
FIG. 2 illustrates another example of a communication system in accordance with the disclosed embodiments.

FIG. 2 illustrates another example of a communication system 200 in which concepts consistent with the principles of the invention may be implemented. System 200 is similar to system 100 of FIG. 1, except that system 200 illustrates additional details. For example, system 200 illustrates a calling party 210 and a called party 220. As discussed above, calling entity 110 is associated with calling party 210 and called entity 120 is associated with called party 220. In system 200, calling entity 110 may be a smartphone and calling party 210 may be a user/owner of the smartphone. Further, called entity 120 may be a communication device(s) and the called party 220 may include an organization that owns and maintains the communications device(s) and an operator of called entity 120.

Furthermore, in system 200, a voice communication session between calling entity 110 and called entity 120 may be established over a cellular network 250 and PSTN 240. Moreover, in system 200, server 130 is implemented on a cloud platform and may provide the display data to calling entity 110 via the Internet 230 and the cellular network 250.

In the example of FIG. 2, after user 210 uses smartphone 110 to call communication device(s) 120, server 130 may provide display data to smartphone 110 via the Internet and cellular network. Subsequently, smartphone 110 may generate and display visual content generated based on the display data on a screen included in smartphone 110. The display data, and therefore the displayed visual content, may have been configured by the organization (i.e., called party 220) prior to the call. The visual content may include, for example, a logo of the organization. In one example, the visual content may be displayed at least until the call is terminated or a request to terminate the communication session is obtained from user 210.

Figure 3:
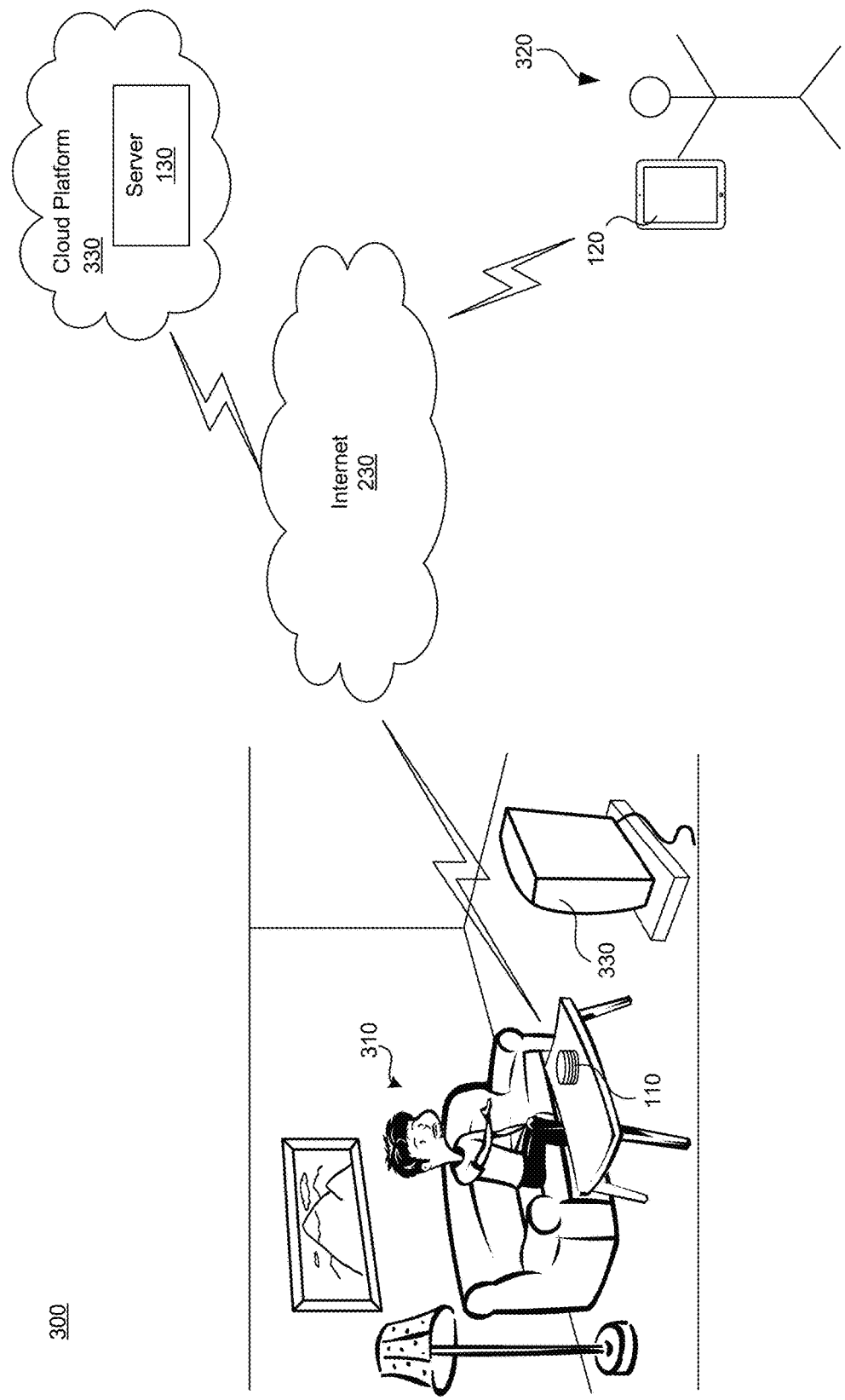
FIG. 3 illustrates yet another example of a communication system in accordance with the disclosed embodiments.

FIG. 3 illustrates yet another example of a communication system 300 in which concepts consistent with the principles of the invention may be implemented. System 300 is similar to system 100 of FIG. 1, except that system 300 illustrates additional details. For example, system 300 illustrates a calling party 310 and a called party 320. As discussed above, calling entity 110 is associated with calling party 310 and called entity 120 is associated with called party 320. In system 300, calling entity 110 may be an internet-of-things (IoT) home assistance device, and calling party 310 may be one or more residents of a house. Further, called entity 120 may be a tablet and calling party 320 may be a user/owner of the tablet.

Furthermore, in system 300, a video/voice communication session between calling entity 110 and called entity 120 may be established over the Internet 230. Moreover, in system 300, server 130 is implemented on a cloud platform 330 and may provide the display data to calling entity 110 via the Internet 230.

In the example of FIG. 3, after user 310 uses IoT device 110 to place a Voice-over-IP/Video call to tablet 120, server 130 may provide display data to IoT device 110 via the Internet 230. Subsequently, IoT device 110 may generate visual content based on the display data and cause display of the visual content on a television 330 connected to IoT device 110 (e.g., via a local Wi-Fi network). The display data, and therefore the displayed visual content, may have been configured by user 320 of tablet 120 (i.e., called party 120) prior to the call. The visual content may include, for example, a self-portrait taken and chosen by user 320. In one example, the visual content may be displayed at least until the call is picked up by user 320 of tablet 120 (i.e., at least until the communication session is established).

Examples of Visual Content

Figure 4:
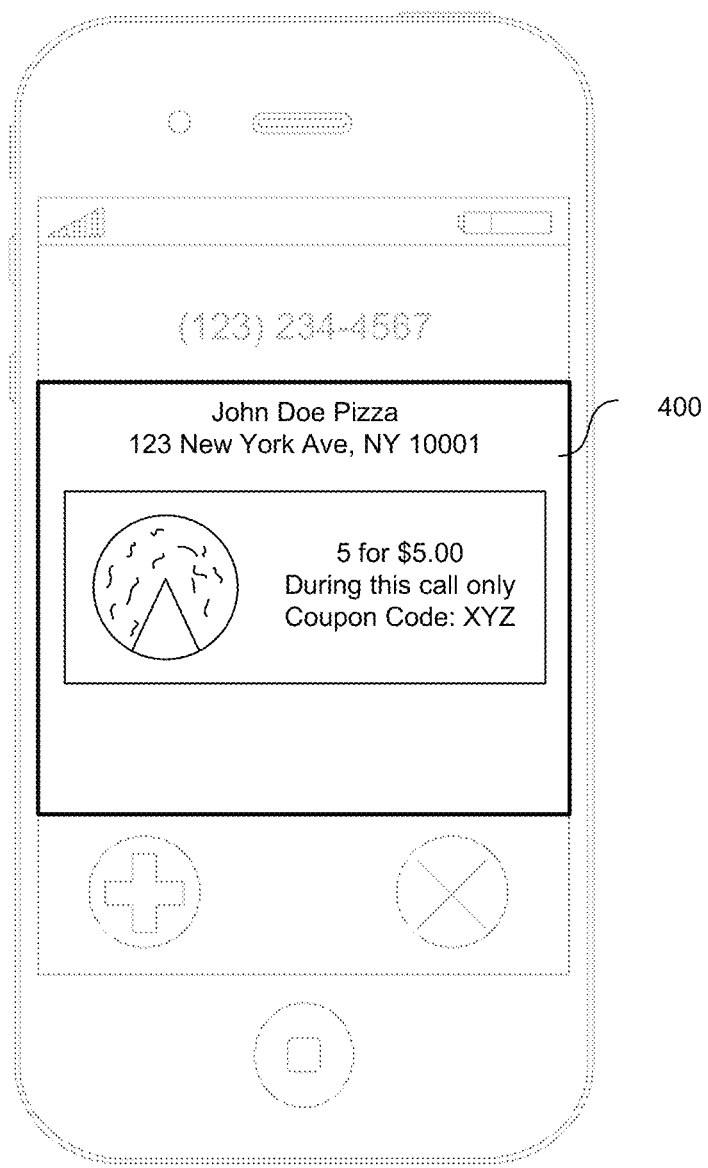
FIG. 4 illustrates an example of visual content in accordance with the disclosed embodiments.
Figure 5:
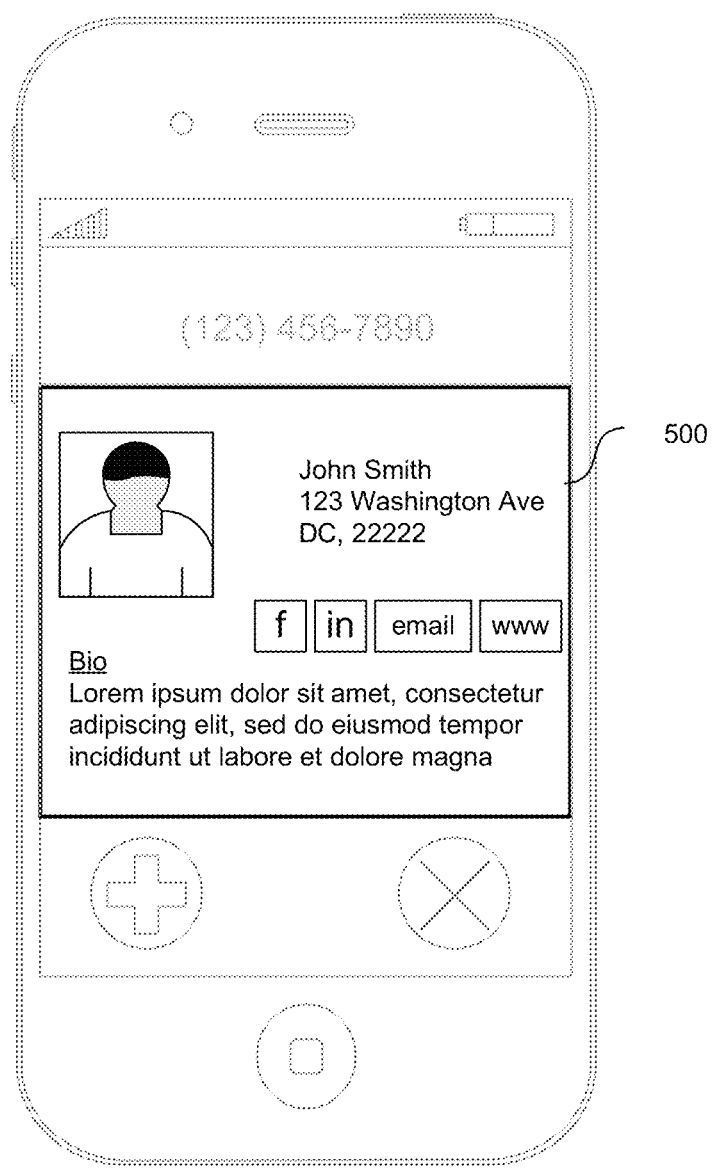
FIG. 5 illustrates another example of visual content in accordance with the disclosed embodiments.
Figure 6:
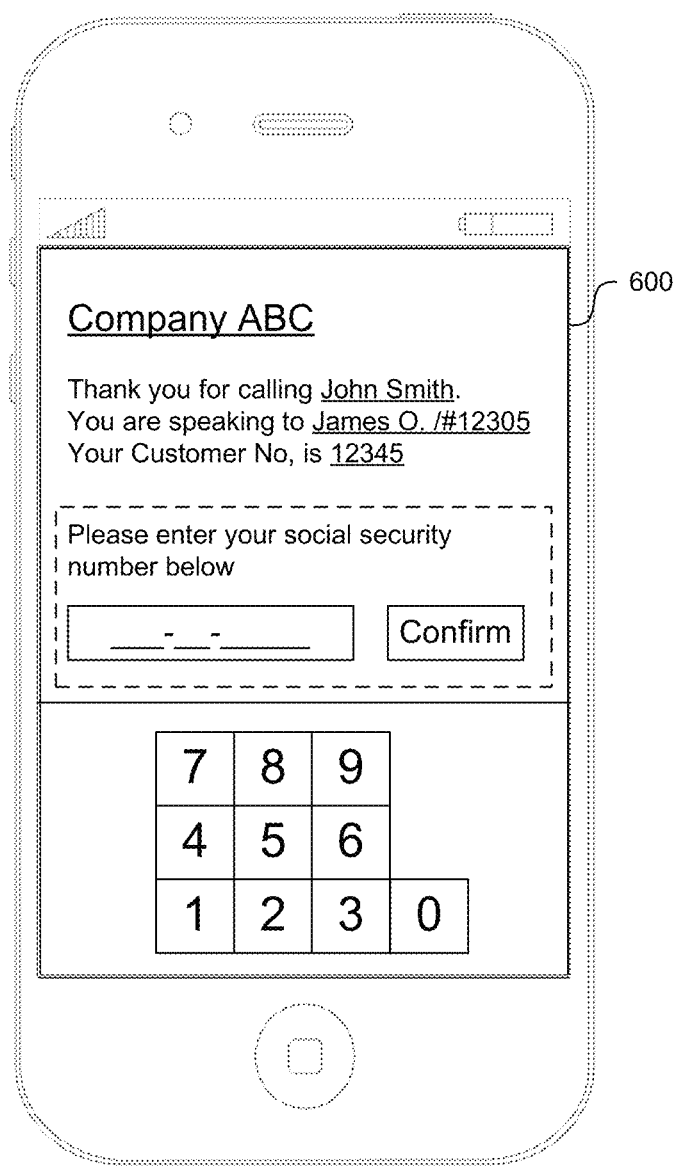
FIG. 6 illustrates yet another example of visual content in accordance with the disclosed embodiments.

FIGS. 4-6 illustrate examples of visual content 400, 500, and 600 in accordance with the disclosed embodiments. The visual contents 400, 500, and 600 may be displayed, for example, on a screen associated with calling entity 110 after calling entity 110 attempts to initiate a communication session with called entity 120. In the examples of FIGS. 4-6, calling entities 110 may be smartphones.

In FIG. 4, visual content 400 occupies a portion of a screen of a smartphone and includes a name of called party 120, a location of called party 120, and an advertisement of a product/service offered by called party 120. Visual content 400 may be static as shown in FIG. 4. Alternatively, visual content 400 may be dynamic. For example, visual content 400 may cycle through a set of advertisements. In another example, visual content 400 may include an animated advertisement. In the example of FIG. 4, visual content 400 may stop being displayed after the communication session with called entity 120 is established so as to avoid distractions during the communication session. As shown in FIG. 4, visual content 400 may be a part of a dialing screen.

In FIG. 5, visual content 500 occupies a portion of a screen of a smartphone and includes a name of called party 120, a self-portrait associated with called party 120, and links to called party 120's websites and social media pages. A user of calling entity 110 may touch (or click) on a link to open the linked webpage or load one of the called party 120's social media page. As shown in FIG. 5, visual content 500 may be a part of a dialing screen.

In FIG. 6, visual content 600 occupies an entire screen of a smartphone and includes information about calling party 110 kept/assigned/generated by called party 120 (e.g., customer number assigned by called party 120 to calling party 110 and/or calling party 110's loyalty status with called party 120), and a textbox for entering sensitive data (e.g., social security number). Visual content 600 may be displayed on calling entity 110 when called entity 120 (or the called party) requires sensitive data from the calling party. For example, instead of providing a social security number over the voice call to a customer support representative, a user of calling entity 110 may provide the social security number using the textbox of visual content 600. The entered number may be encrypted and transmitted to a called party's system, and a user of called entity 120 (e.g., a customer support representative) may receive an indication from the called party's system that the social security number has been received and verified (e.g., without revealing the social security number).

In FIG. 6, visual content 600 may be generated by a software program executing on calling entity 110. For example, the software program may be executed in response to receiving display data from server 130. The display data may include, for example, an identifier of the software program. In some embodiments, the software program may communicate with called entity 120 and/or another device associated with the called party.

An Example of a Process

Figure 7:
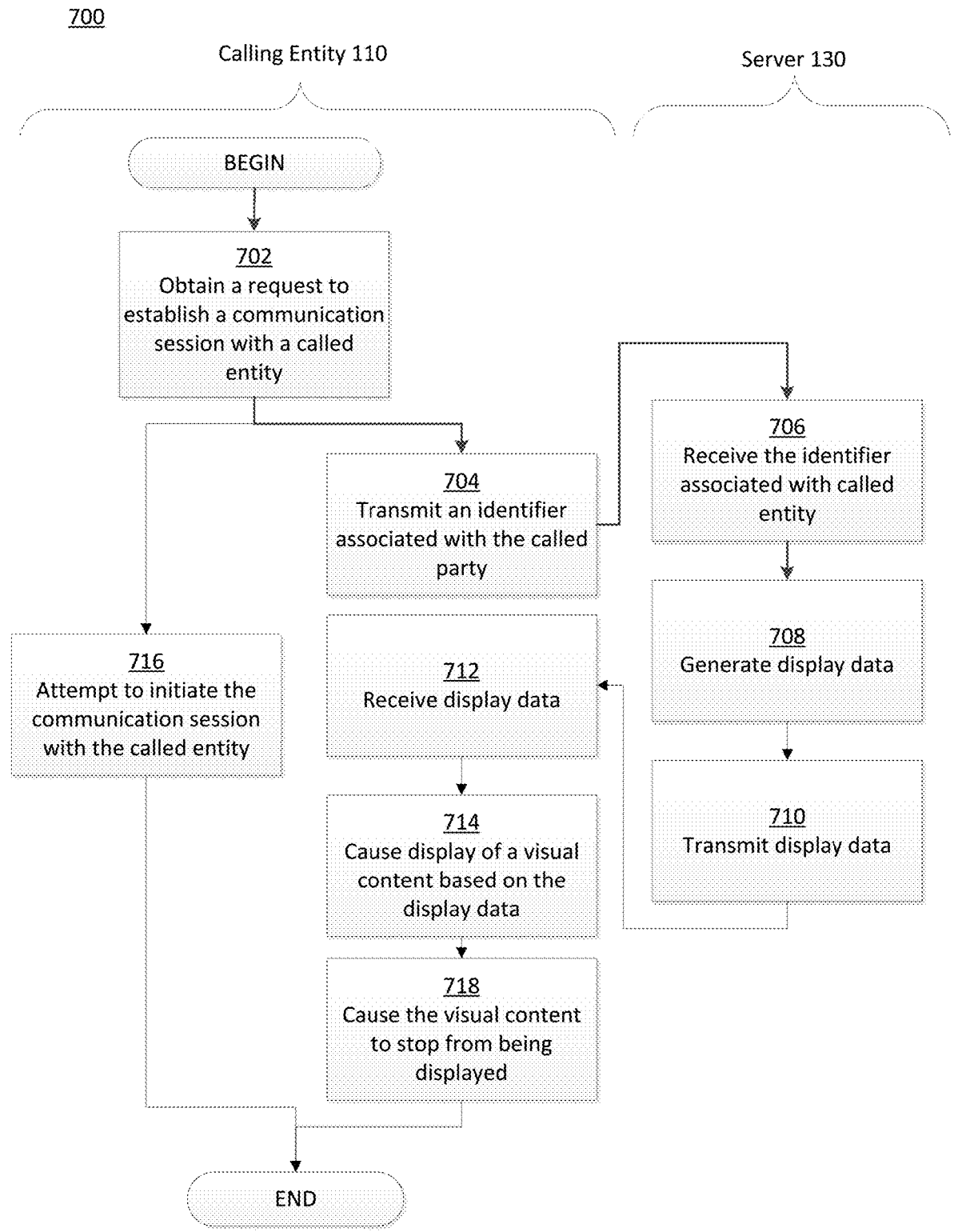
FIG. 7 illustrates a process for causing display of visual content on a screen associated a calling device in accordance with the disclosed embodiments.

FIG. 7 illustrates a process 700 for causing display, on a device associated a calling party, visual content customized by a called party in accordance with the disclosed embodiments. Steps 702, 704, and 712-718 may be implemented by one or more processors of calling entity 110. Steps 706-710 may be implemented by one or more processors of server 130.

At a step 702, calling entity 110 may obtain a request (e.g., from a calling party) to establish a communication session with called entity 120. For example, calling entity 110 may receive an input from a user of calling entity 110 to initiate a voice call with called entity 120. In another example, calling entity 110 may receive an instruction from a software executing on calling entity 110 to initiate a video call with called entity 120. In yet another example, calling entity 110 may receive an instruction from another entity to initiate a one-way video call with called entity 120.

At a step 704, calling entity 110 may transmit an identifier associated with the called party to server 130. In some embodiments, the identifier associated with the called party may include an identifier of called entity 120 and/or an identifier of the called party. For example, the may include a phone number associated with the called party and/or called entity 120.

In some embodiments, calling entity 110 may further transmit an identifier associated with the calling entity 110 to server 130. In some embodiments, the identifier associated with the calling entity 110 may include an identifier of calling entity 110 and/or an identifier of the calling party. For example, the identifier associated with the calling entity 110 may include an identifier of calling entity 110 and/or an identifier of the calling party. In some embodiments, identifier associated with the calling entity 110 may include data identifying capability of calling entity 110 and/or a device type/class of calling entity 110 (e.g., whether the calling entity 110 is a tablet, a smartphone, a land-line phone).

At a step 706, server 130 may receive the transmitted identifier associated with called entity 120. In some embodiments, server 130 may further receive an identifier associated with the calling entity 110.

At a step 708, server 130 may generate display data.

As discussed above, the display data may be any data that may be used by calling entity 110 to cause display of visual content. In some embodiments, the display data may be provided to calling entity 110 after calling entity 110 attempts to initiate a communication session with called entity 120. Calling entity 110, after receiving the display data, may cause display of visual content generated based on the display data on a screen associated with calling entity 110.

Further as discussed above, in some embodiments, the display data may include data representing at least a portion of the visual content. For example, the display data may include data representing a picture. Alternatively, or additionally, the display data may include an instruction for generating at least a portion of the visual content. For example, the display data may include some code based on a markup language (e.g., HTML). In another example, the display data may include some code based on a proprietary language for defining appearances of various objects included in the visual content. In these examples, the code may be used by calling entity 110 to generate and cause display of visual content. In some embodiments, the display data may include a software program or an identifier of the software program on calling entity 110. Upon receiving the software program or the identifier of the software program, calling entity 110 may install and/or execute the software program. The software program may be programmed to generate and cause display of visual content.

In some embodiments, the display data may be generated based on an identifier associated with the calling entity 110. In embodiments where server 130 receives data identifying capability of calling entity 110, the generated display data may include instructions for utilizing at least some of the identified capability to generate the visual content. For example, in embodiments where server 130 receives data identifying that calling entity 110 is capable of rendering three-dimensional animations, the generated display data may include code for rendering three-dimensional animations as a part of the visual content. In embodiments where server 130 receives a device type/class of calling entity 110, server 130 may generate the display data that is appropriate for the identified device type/class. For example, server 130 may generate display data that cause display of high-resolution visual content for tablets while generating display data that cause display of low-resolution visual content for smart watches.

In some embodiments, the display data may be generated based on configuration data associated with a called party. In these embodiments, the configuration data may include an instruction that can be used (e.g., by server 130) to generate at least a portion of the display data. For example, configuration data may include some code based on a mark-up language or a proprietary language that can be executed by server 130 to generate at least a portion of the display data. In some embodiments, the configuration data may include at least a portion of the display data. That is, the generation of the display data may include using the obtained configuration data as a part of the display data. For example, the configuration data may include data representing graphics, text, and/or sound that may be included in the display data, and subsequently displayed/played as visual content on a screen associated with calling entity 110. In this example, the graphics, text and/or sound may be associated with the called party. The graphics may include, for example, a logo of the called party; the text may include, for example, a name and a location of the called party; and sound may include, for example, the called party's theme music. In some embodiments, the configuration data may be the same as the display data. That is, the generation of the display data may include using the obtained configuration data as the display data.

In some embodiments, configuration data associated with the called party may be obtained by server 130 using the identifier associated with the called party. For example, configuration data may be stored on a database that may be searched using the identifier associated with the called party, and server 130 may access the configuration data associated with a party by searching the database using an identifier associated with the party.

In some embodiments, the configuration data may have been provided by the associated party (i.e., called party 120). For example, the configuration data may have been provided by a called party 120 (e.g., a representative of an organization, a user of a cell phone). In some embodiments, the configuration data may have been provided by the associated party prior to process 700. Alternatively, the configuration data may have been provided by the associated party prior to step 708.

In some embodiments, the configuration data may have been provided to server 130. Alternatively, or additionally, the configuration data may have been provided to another server, and the server may have stored the obtained configuration data on a data store accessible by server 130. In one example, the configuration data may have been generated by a called party 120 via a website. The website may have received one or more input from called party 120 to generate the configuration data. Further, the generated configuration data may have been stored on a data store accessible by server 130 (e.g., data store included in server 130).

In some embodiments, the display data may be generated based on configuration data associated with the called party and a template display data. In these embodiments, the template display data may include display data that is missing one or more pieces of information and the configuration data may include the missing pieces of information. Thus, the display data may be generated by inserting the information included in the configuration data into the template display data.

At a step 710, server 130 may transmit the display data. In some embodiments, server 130 may transmit the display data via the Internet. In some embodiments, server 130 may provide the display data by storing the display data on a data store accessible by calling entity 110.

At a step 712, calling entity 110 may receive the display data. In some embodiments, calling entity 110 may receive the display data via the Internet. In some embodiments, calling entity 110 may obtain the display data by retrieving the display data. For example, calling entity 110 may retrieve the display data stored on a data store by server 130.

In some embodiments, calling entity 110 may receive the display data via at least one of Wi-Fi, cellular network (e.g., LTE, 3G), Ethernet, Bluetooth, and near-field communication (NFC) transceivers.

At a step 714, calling entity 110 may cause display of visual content based on the display data. In some embodiments, calling entity 110 may display the visual content on a screen included in, or accessible to, calling entity 110.

At a step 716, calling entity 110 may attempt to initiate the communication session with called entity 120. In some embodiments, the communication session may be initiated before, during, and/or after one or more of steps 704-714. In one example, calling entity 110 may attempt to initiate the communication session by calling called entity 120, and the communication session may be established after called entity 120 picks up the call. In some embodiments, after the communication session is initiated, calling entity 110 may cause the displayed visual content to change. For example, after the communication session is initiated, calling entity 110 may cause a different visual content, one that is less distracting than the initial visual content, to be displayed.

At a step 718, calling entity 110 may cause the visual content to stop from being displayed. In some embodiments, calling entity 110 may cause the visual content to stop from being displayed after the communication session is initiated (i.e., established). Alternatively, calling entity 110 may cause the visual content to stop from being displayed after the communication session is terminated or requested (e.g., by a user of calling entity 110) to be terminated. In some embodiments, server 130 may cause the visual content to stop from being displayed.

In some embodiments, steps 704, 712, 714, and/or 716 may be performed in response to obtaining a request to establish a communication session at step 702. In some embodiments, steps 712 and 714 may be performed after obtaining a request to establish a communication session at step 702. In some embodiments, steps 708, 710, 712, and 714 may be performed multiple times during process 700. For example, calling entity 110 may receive an updated display data from server 130 and may cause display of a new visual content based on the updated display data.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

I claim:

1. A device associated with a calling party, the device comprising:
   one or more processors configured to:
      obtain a request to establish a communication session with a device associated with the called party;
      in response to obtaining the request to establish the communication session:
         attempt to initiate the communication session;
         transmit an identifier of the called party to a server;
         obtain display data from the server, wherein the display data (1) is generated based on configuration data associated with the called party and (2) includes an identifier of a software program; and
         cause display of visual content generated based on the display data by executing the software program identified in the display data on the device associated with the calling party.

2. The device of claim 1, wherein the configuration data is provided by the called party.

3. The device of claim 2, wherein the configuration data includes information associated with the calling party.

4. The device of claim 1, wherein the visual content is displayed at least until (i) the communication session is terminated, (ii) a request to terminate the communication session is obtained, and/or (iii) the communication session is established.

5. The device of claim 1, wherein the visual content is an interactive visual content and responsive to an input from the calling party.

6. The device of claim 5, wherein the input from the calling party is transmitted to one or more devices associated with the called party.

7. The device of claim 1, wherein the display data includes data representing at least a portion of the visual content.

8. The device of claim 1, wherein the display data includes an instruction for generating at least a portion of the visual content.

9. A method for displaying, on a device associated with a calling party, visual content customized by a called party, comprising:
   obtaining a request to establish a communication session with a device associated with the called party;
   in response to obtaining the request to establish the communication session:
      attempt to initiate the communication session;
      transmitting an identifier of the called party to a server;
      obtaining a display data from the server, wherein the display data (1) is generated based on configuration data associated with the called party and (2) includes an identifier of a software program; and
      causing display of visual content generated based on the display data by executing the software program identified in the display data on the device associated with the calling party.

10. The method of claim 9, wherein the configuration data is provided by the called party.

11. The method of claim 10, wherein the configuration data includes information associated with the calling party.

12. The method of claim 9, wherein the visual content is displayed at least until (i) the communication session is terminated, (ii) a request to terminate the communication session is obtained, and/or (iii) the communication session is established.

13. The method of claim 9, wherein the visual content is an interactive visual content and responsive to an input from the calling party.

14. The method of claim 13, wherein the input from the calling party is transmitted to one or more devices associated with the called party.

15. The method of claim 9, wherein the display data includes data representing at least a portion of the visual content.

16. The method of claim 9, wherein the display data includes an instruction for generating at least a portion of the visual content.

17. A non-transitory computer-readable storage medium storing instructions that when executed by a computer cause the computer to perform a method for displaying, on a device associated with a calling party, visual content customized by a called party, the method comprising:
   obtaining a request to establish a communication session with a device associated with the called party;
   in response to obtaining the request to establish the communication session:
      attempting to initiate the communication session;
      transmitting an identifier of the called party to a server;
      obtaining a display data from the server, wherein the display data (1) is generated based on configuration data associated with the called party and (2) includes an identifier of a software program; and
      causing display of visual content generated based on the display data by executing the software program identified in the display data on the device associated with the calling party.

18. The device of claim 1, wherein the server, in response to receiving the identifier, accesses the configuration data associated with the called party using the identifier of the called party, and the display data is generated based on the accessed configuration data.

* * * * *